United States Patent [19]

Matsumoto

[11] Patent Number: 5,425,053

[45] Date of Patent: Jun. 13, 1995

[54] RADIO COMMUNICATION APPARATUS WHICH CAN QUICKLY RECOVER FROM MISJUDGEMENT OF LEVELS OF A MULTILEVEL MODULATED SIGNAL

[75] Inventor: Mariko Matsumoto, Tokyo, Japan

[73] Assignee: NEC Corporation, Tokyo, Japan

[21] Appl. No.: 225,793

[22] Filed: Apr. 11, 1994

[51] Int. Cl.[6] .......................................... H04L 25/49
[52] U.S. Cl. ...................................... 375/287; 375/316
[58] Field of Search ........................ 375/10, 17, 75, 80, 375/94; 329/300, 304; 455/142, 143, 214, 226.1; 341/56–57; 340/825.44

[56] References Cited

U.S. PATENT DOCUMENTS 5,048,015  9/1991  Zilberfarb ............................ 375/10
5,052,021  9/1991  Goto et al. ........................... 375/76
5,311,554  5/1994  Morera et al. ....................... 375/75

FOREIGN PATENT DOCUMENTS 0469647  2/1992  European Pat. Off. .

OTHER PUBLICATIONS

Journal of Lightwave Technology, vol. 7, No. 11, Nov. 1989, pp. 1634–1640, Kawai et al, "Smart optical receiver with automatic decision threshold setting and retiming phase alignment".
Patent Abstracts of Japan, vol. 10, No. 11, 17 Jan. 1986.

Primary Examiner—Stephen Chin
Assistant Examiner—Young Tse
Attorney, Agent, or Firm—Sughrue, Mion, Zinn, Macpeak & Seas

[57] ABSTRACT

In a radio communication apparatus comprising a demodulator (12) for demodulating a multilevel modulated signal (10) into a time sequence of multilevel symbols which have symbol levels to define a variable pattern by a level difference between the symbol levels of at least two successive adjacent ones of the multilevel symbols, a coincidence detecting section (16) detects coincidence between the variable pattern and a predetermined pattern and calculates judgement levels when the variable pattern coincides with the predetermined pattern with a tolerance. A multilevel-to-binary converter (14) converts the time sequence of multilevel symbols into a binary signal of binary values by judging the symbol levels on the basis of the judgement levels. Preferably, a variation following level calculating section (30) calculates variation following levels for use as the judgement levels by using the symbol levels, the binary values, and the judgement levels.

14 Claims, 5 Drawing Sheets

RADIO COMMUNICATION APPARATUS WHICH CAN QUICKLY RECOVER FROM MISJUDGEMENT OF LEVELS OF A MULTILEVEL MODULATED SIGNAL

BACKGROUND OF THE INVENTION

This invention relates to a radio communication apparatus which receives a multilevel modulated signal. The radio communication apparatus may be a radio paging receiver, a transceiver, or the like although description will be mainly made in connection with the radio paging receiver.

A conventional radio paging receiver of the type described, generally comprises demodulator which demodulates the multilevel modulated signal into a time sequence of multilevel symbols having symbol levels. A signal converting section converts the time sequence of multilevel symbols into a binary or digital signal of binary or digital values by judging said symbol levels on the basis of judgement levels.

The symbol levels of the time sequence of multilevel symbols are liable to a level variation due to a signal variation of the multilevel modulated signal. In order to compensate for the level variation of the symbol levels, the signal converting section varies the judgement levels in accordance with the level variation of the symbol levels. Alternatively, the signal converting section subtracts the level variation from the symbol levels with the judgement levels kept in fixed values.

Such signal converting sections can correctly judge the symbol levels when the level variation of the symbol levels is less than half of a judgement level difference between two adjacent ones of the judgement levels. However, the signal converting sections unavoidably misjudge the symbol levels when the level variation is not less than half of the judgement level difference. Such misjudgement is maintained for a succeeding part of the multilevel modulated signal without recovery from a misjudgement state.

SUMMARY OF THE INVENTION

It is therefore an object of this invention to provide a radio communication apparatus which can quickly recover from a misjudgement state.

It is another object of this invention to provide a radio communication apparatus of the type described, which can correctly judge levels of a multilevel modulated signal.

Other objects of this invention will become clear as the description proceeds.

On describing the gist of an aspect of this invention, it is possible to understand that a radio communication apparatus is for receiving a multilevel modulated signal and comprises: demodulating means for demodulating the multilevel modulated signal into a time sequence of multilevel symbols having symbol levels liable to a level variation to define a variable pattern by a level difference between the symbol levels of at least two adjacent ones of the multilevel symbols; and signal converting means for converting the time sequence of multilevel symbols into a binary signal of binary values by judging the symbol levels on the basis of judgement levels.

According to the aspect of this invention, the signal converting means comprises in the above-understood radio communication apparatus: coincidence detecting means for detecting coincidence between the variable pattern and a predetermined pattern to calculate the judgement levels when the variable pattern coincides with the predetermined pattern within a tolerance.

On describing the gist of a different aspect of this invention, it is possible to understand that a radio communication apparatus is for receiving a multilevel modulated signal and comprises: demodulating means for demodulating the multilevel modulated signal into a time sequence of multilevel symbols having symbol levels liable to a level variation to define a variable pattern by at least two adjacent ones of the multilevel symbols; and signal converting means for converting the time sequence of multilevel symbols into a binary signal of binary values by judging the symbol levels on the basis of judgement levels.

According to the different aspect of this invention, the signal converting means comprises in the above-understood radio communication apparatus: coincidence detecting means for detecting coincidence between the variable pattern and a predetermined pattern to calculate the judgement levels when the variable pattern coincides with the predetermined pattern within a tolerance.

DESCRIPTION OF THE PREFERRED EMBODIMENTS

Figure 1:
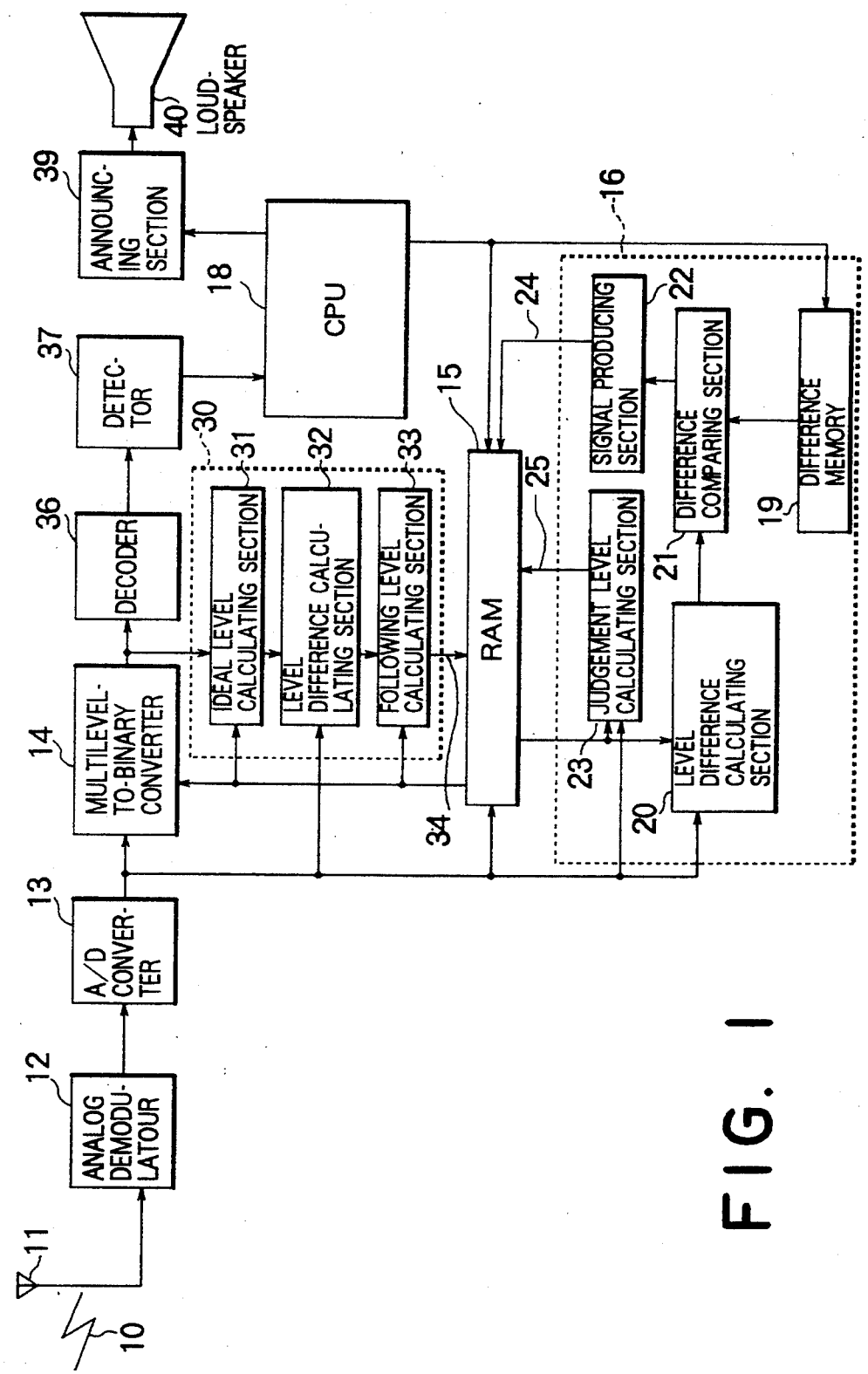
FIG. 1 is a block diagram of a radio paging receiver according to a first embodiment of this invention.

Referring to FIG. 1, a radio paging receiver according to a first embodiment of this invention is for receiving a multilevel modulated signal 10 through an antenna 11. The multilevel modulated signal 10 is given by phase-shift keying, frequency-shift keying, or the like and carries an information signal directed to the radio paging receiver for detection of the information signal. An analog demodulator 12 demodulates the multilevel modulated signal 10 into a time sequence of multilevel symbols having analog symbol levels. An A/D (analog-to-digital) converter 13 converts the time sequence of multilevel symbols into a time sequence of multilevel symbols having digital symbol levels, each of which is represented by an eight-bit digital signal.

Figure 2:
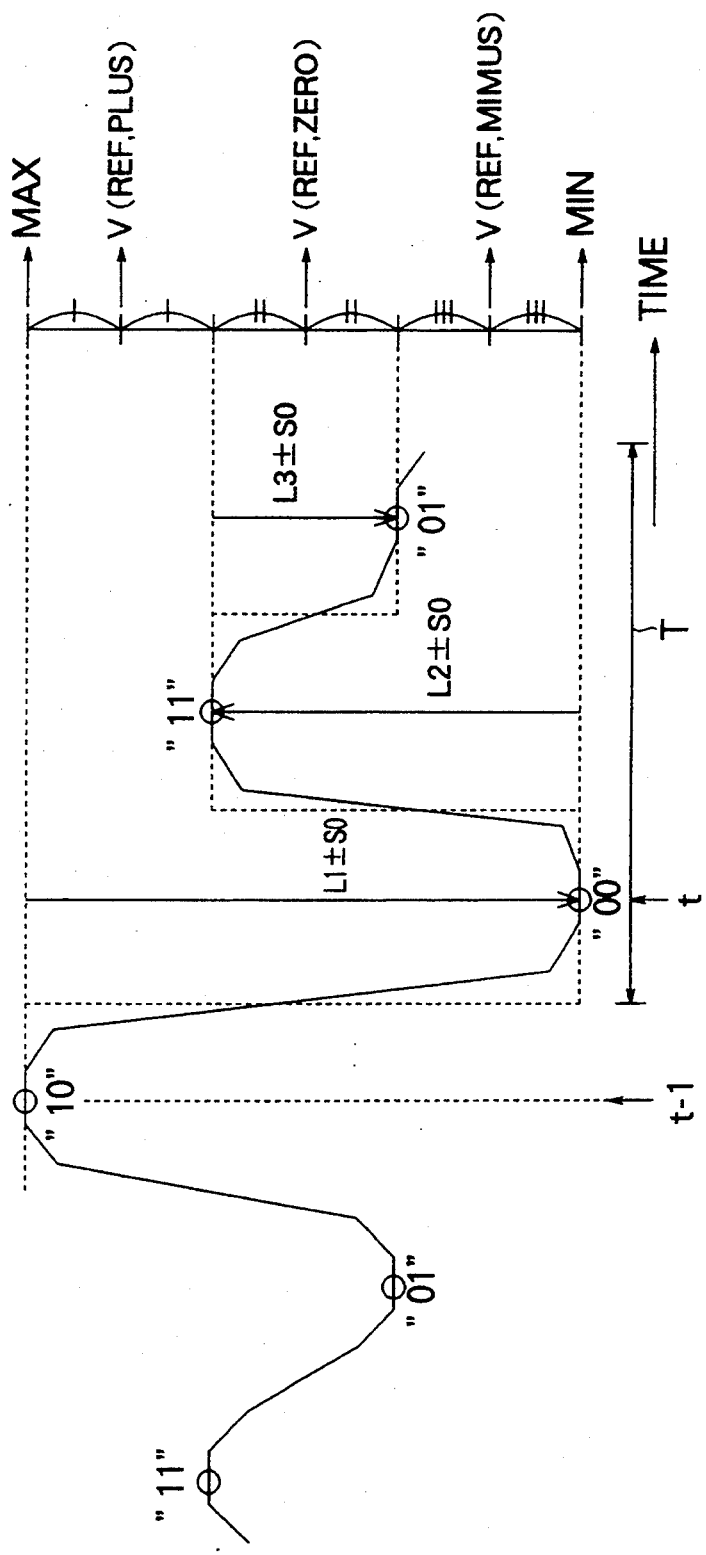
FIG. 2 is a time chart for use in describing operation of a radio paging receiver according to this invention.

Turning to FIG. 2, the time sequence of multilevel symbols is exemplified when the multilevel modulated signal 10 is a four-level modulated signal. The multilevel symbols are shown by circles. The four-level modulated signal represents Gray codes. That is, one multilevel symbol represents two bits of the binary signal. The multilevel symbols have four symbol levels which are variable between a greatest maximum MAX of a positive value and a least minimum MIN of a negative value. The multilevel symbol having the least minimum MIN of the negative value represents the bits "00" of the binary signal. The multilevel symbol of another negative value represents the bits "01" of the binary signal. The multilevel symbol having the greatest maximum MAX of the positive value represents the bits "10" of the binary signal. The multilevel symbol having another positive value represents the bits "11".

The symbol levels of the multilevel symbols are liable to a level variation due to a signal variation of the multilevel modulated signal 10 (FIG. 1) as mentioned above. However, a level difference is kept unchanged between the symbol levels of two successive adjacent ones of the multilevel symbols even if the level variation occurs in the multilevel symbols. It will be supposed that the time sequence of multilevel symbols defines a variable pattern by at least two successive adjacent ones of the multilevel symbols or, more particularly, by the level difference between the symbol levels of at least two successive adjacent ones of the multilevel symbols.

Turning back to FIG. 1 with reference to FIG. 2 continued, a multilevel-to-binary converter 14 serves in cooperation with a RAM (random access memory) 15 as a signal converting section which converts the time sequence of multilevel symbols into a binary (or digital) signal of binary (or digital) values by judging the symbol levels on the basis of judgement levels. The judgement levels are indicated by V(ref, plus), V(ref, zero), and V(ref, minus) in FIG. 2. The RAM 15 will later be described.

In FIG. 1, a coincidence detecting section 16 detects coincidence between the variable pattern and a predetermined pattern and calculates the judgement levels 16 when the variable pattern coincides with the predetermined pattern with a tolerance in the manner which will presently be described.

In the radio paging receiver, the analog demodulator 12 has a sensitivity which is inevitably subjected to a sensitivity variation with time to give rise to a fluctuation in the symbol levels. The tolerance is determined in consideration of the fluctuation. More specifically, the tolerance is determined to be equal to twice the fluctuation.

With reference to FIGS. 1 and 2, description will proceed to details of the coincidence detecting section 16. It will be assumed in FIG. 2 that the symbol levels of the time sequence of multilevel symbols are equal to a current level at a current time instant (t) and a previous level at a previous time instant (t−1) preceding the current time instant (t) and that a level difference L1 between the current and the previous levels defines the variable pattern. The previous level is stored in the RAM 15 as a stored level. Operation of the RAM 15 is controlled by a CPU (central processing unit) 18.

A difference memory 19 is typically a ROM (read-only memory) and preliminarily memorizes a predetermined difference which defines the predetermined pattern. The predetermined difference is at least one selected from differences (L1±S0), (L2±S0), and (L3±S0) illustrated in FIG. 2, where S0 represents the tolerance. Operation of the difference memory 19 is also controlled by the CPU 18.

A level difference calculating section 20 calculates the level difference L1 between the current and the stored level. A difference comparing section 21 compares the level difference L1 with the predetermined difference to produce a coincidence signal when the level difference between the current and the stored levels coincides with the predetermined difference within the tolerance S0. A signal producing section 22 produces a pattern match signal (or an enable signal) in response to the coincidence signal.

Thus, a combination of the level difference calculating section 20, the difference comparing section 21, and the signal producing section 22 is operable as a pattern matching section. The pattern matching section (20–22) compares the current level with the stored level and produces the pattern match signal when the variable pattern coincides with the predetermined pattern within the tolerance S0.

A judgement level calculating section 23 calculates the judgement levels V(ref, plus), V(ref, zero), and V(ref, minus) by using the current level and the stored level. It will be supposed that the current and the stored (or previous) levels are represented by V(t) and V(t−1), respectively, and that the current and the stored levels V(t) and V(t−1) are equal to the least minimum MIN and the greatest maximum MAX, respectively. In this case, the judgement level calculating section 23 calculates the judgement levels V(ref, plus), V(ref, zero), and V(ref, minus) in accordance with equations:

$$V(\text{ref, plus}) = \{V(t-1) + V(t)\}/2 + \{V(t-1) - V(t)\}/3,$$

$$V(\text{ref, zero}) = \{V(t-1) + V(t)\}/2,$$

and $$V(\text{ref, minus}) = \{V(t-1) + V(t)\}/2 - \{V(t-1) - V(t)\}/3,$$

when the tolerance S0 is put out of consideration. Signal lines 24 and 25 serve as a storing section which stores the judgement levels in the RAM 15 in response to the pattern match signal (or the enable signal).

The multilevel-to-binary converter 14 is a level judging section and judges the current level by using the judgement levels of the RAM 15 to produce the binary signal.

In FIG. 1, a variation following level calculating section 30 calculates variation following levels for use as the judgement levels by using the symbol levels, the binary levels, and the judgement levels.

Figure 3:
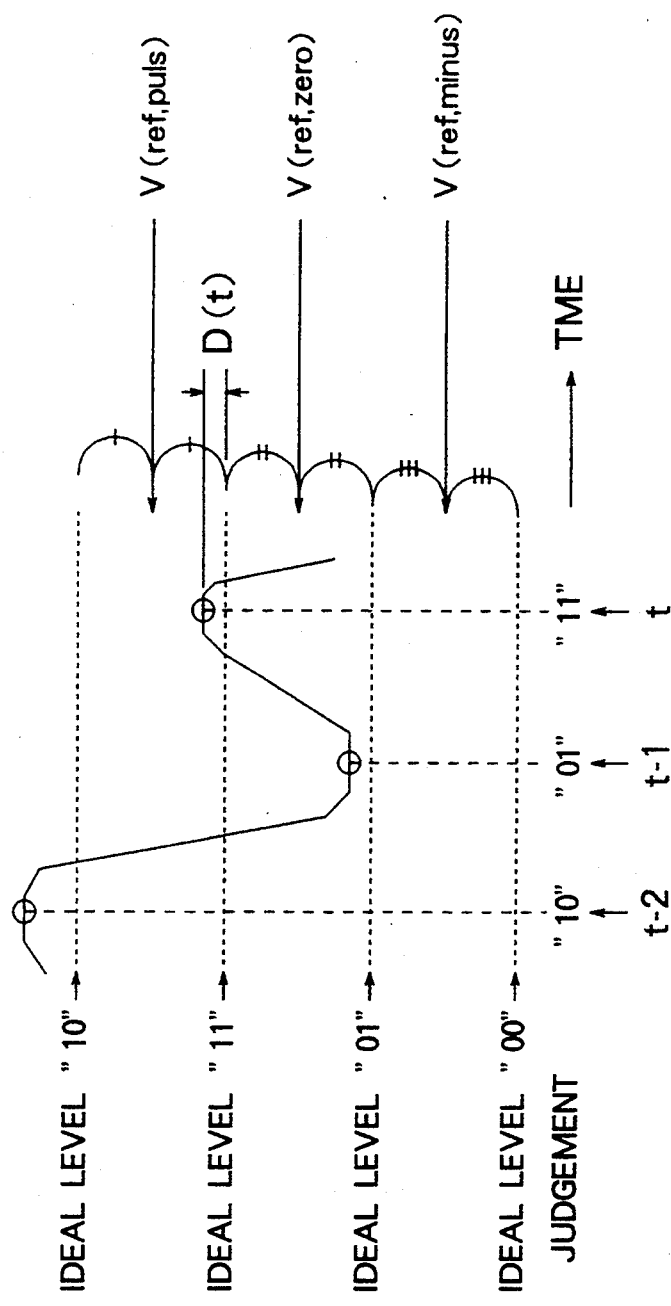
FIG. 3 is a time chart for use in describing another operation of the radio paging receiver according to this invention.

Turning to FIG. 3 with reference to FIG. 1 continued, description will proceed to details of the variation following level calculating section 30. An ideal level calculating section 31 calculates, with reference to the judgement levels V(ref, plus), V(ref, zero), and V(ref, minus), one of four ideal levels "10", "11", "01", and "00" that corresponds to the binary signal. Assuming in FIG. 3 that the the ideal level "11" is calculated as one of the ideal levels "10", "11", "01", and "00" that corresponds to the binary signal at the current time instant (t), a level difference calculating section 32 calculates a level difference D(t) between the current level and the ideal level "11". A following level calculating section 33 calculates the variation following levels by using the level difference D(t) and the judgement levels of the RAM 15. A signal line 34 is operable as a substituting section which substitutes the variation following levels in the RAM 15 for the judgement levels V(ref, plus), V(ref, zero) and V(ref, minus). The multilevel-to-binary converter (or the level judging section) 14 carries out judgement of the current-level as "11" at the current time instant (t) and uses the variation following levels instead of the judgement levels V(ref, plus), V(ref, zero) and V(ref, minus) after the current time instant (t).

In FIG. 1, a decoder 36 decodes the binary signal into the information signal. Connected to the decoder 36, a detector 37 detects the information signal specific to the radio paging receiver and produces a detection signal.

Thus, the decoder 36 and the detector 37 act as a signal detecting section which detects the information signal in the binary signal. The information signal is specified by the time sequence of multilevel symbols illustrated in FIGS. 2 and 3.

The CPU (central processing unit) 18 processes the detection signal into a drive command signal. An announcing section 39 drives a loudspeaker 40 in response to the drive command signal to make the loudspeaker 40 generates a call tone indicative of a call to the radio paging receiver.

Figure 4:
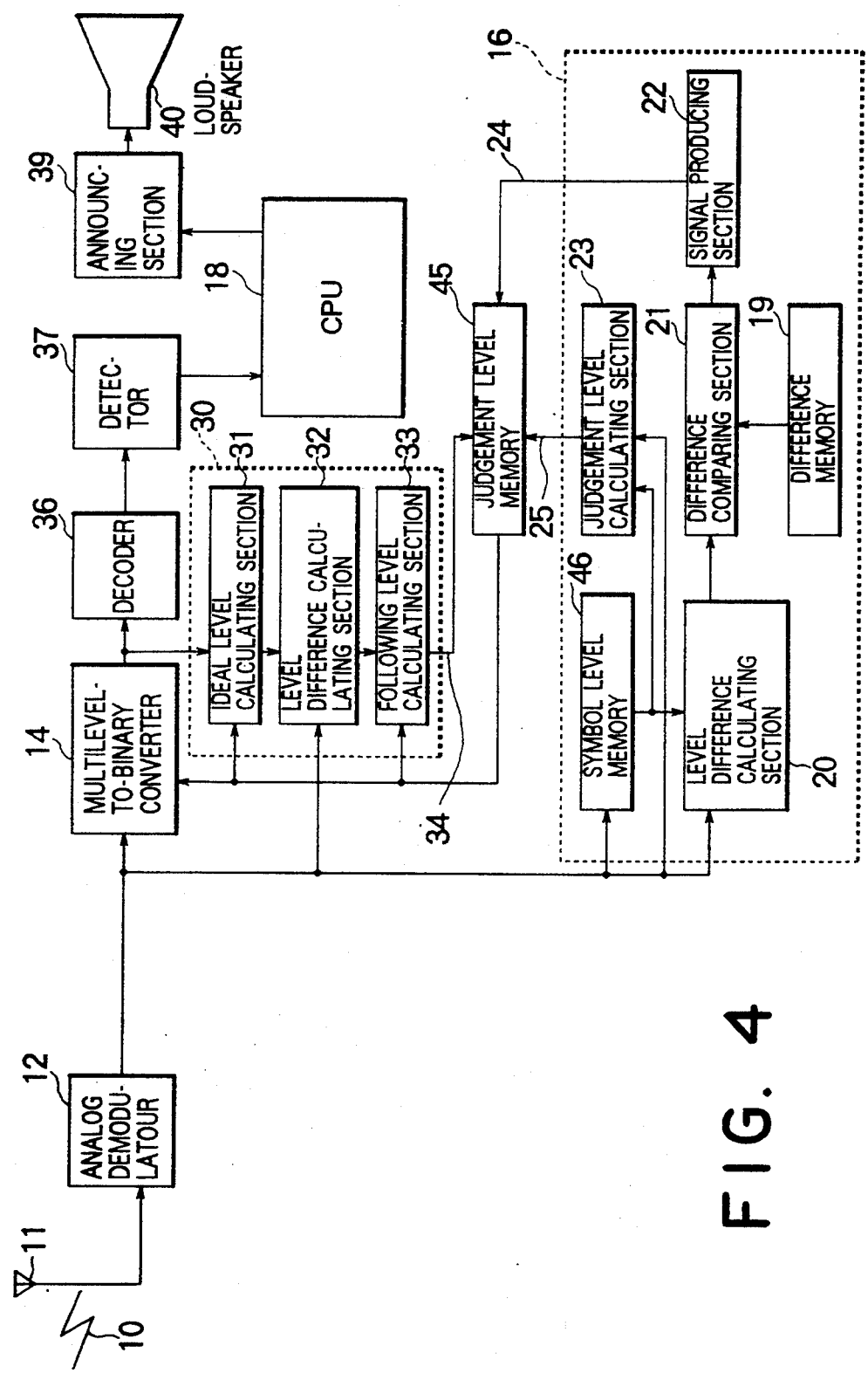
FIG. 4 is a block diagram of a radio paging receiver according to a second embodiment of this invention.

Turning to FIG. 4, a radio paging receiver according to a second embodiment of this invention is similar in structure to the radio paging receiver of FIG. 1 except that the A/D converter 13 is removed from the radio paging receiver and that a judgement level memory 45 and a symbol level memory 46 are used instead of the RAM 15. The symbol level memory 46 is included in the coincidence detecting section 16. The previous level is store, the multilevel-to-binary converter 14 has three comparators 141 and two OR circuits 142 which produce the most significant bit MSB and the least significant bit LSB as two bits of the binary signal.

The difference memory 19 has a resistance type potential divider which produces predetermined differences L2+S0, L2−S0, L3+S0, L3−S0, L1+S0, and L1−S0. The level difference calculating section 20 has an operational amplifier 201. The difference comparing section 21 has six comparators 211 and three OR circuits 212 and produces the level differences L1, L2, and L3. The signal producing section 22 has a shift register 221 and an AND circuit 222. The symbol level memory 46 has four sample-and-hold circuits 461 and produces stored levels of "10", "00", "11", and "01". The judging level calculating section 23 has four buffers 231 and a resistive divider and produces the judgement levels V(ref, plus), V(ref, zero), and V(ref, minus). The judgement level memory 45 has a sample-and-hold circuit 451.

The ideal level calculating section 31 has three buffers 311, four operational amplifiers 312, and an analog switch 313. The level calculating section 32 has an operational amplifier 321. The following level calculating section 33 has two operational amplifiers 331 and two analog switches 332.

Figure 5:
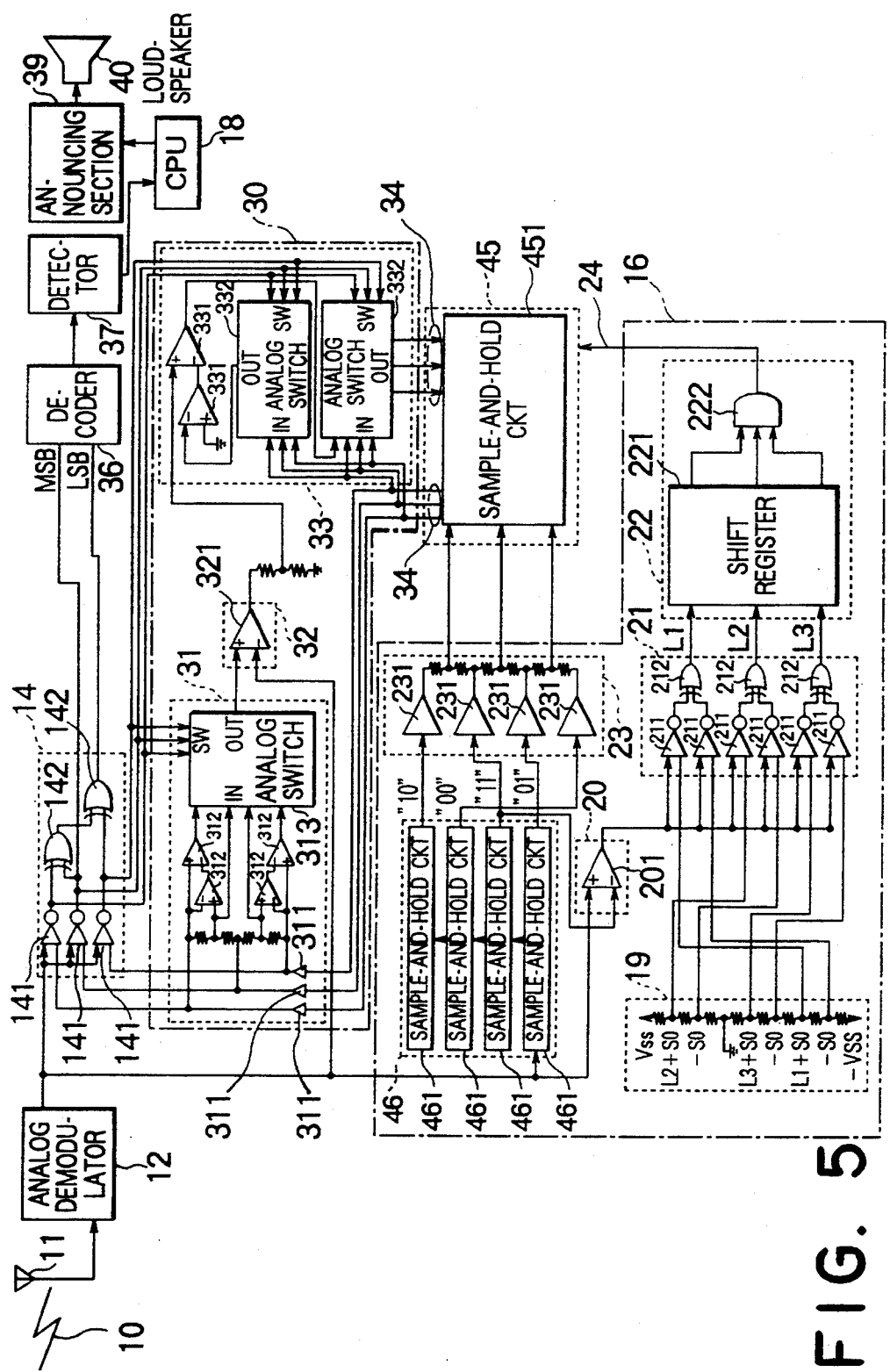
FIG. 5 is a block diagram of a radio paging receiver according to a third embodiment of this invention.

Turning back to FIG. 2 with reference to FIG. 5, it will be assumed that the coincidence detecting section 16 sequentially receives first through fourth multilevel symbols. The level difference between the first and the second multilevel symbols is within a value L1±S0. The level difference between the second and the third multilevel symbols is within another value L2±S0. The level difference between the third and the fourth multilevel symbols is within still another value L3±S0. Inasmuch as the difference memory 19 produces the predetermined differences L1±S0, L2±S0, and L3±S0, the pattern matching section (20, 21, and 22) produces the pattern match signal. In FIG. 2, T represents a pattern match detection duration. Simultaneously, the judgement level calculating section 23 calculates the judgement levels V(ref, plus), V(ref, zero), and V(ref, minus) from the symbol levels of the first through the fourth multilevel symbols. The calculated judgement levels V(ref, plus), V(ref, zero), and V(ref, minus) are stored in the judgement level memory 45 in response to the pattern match signal.

Thereafter, the multilevel-to-binary converter 14 judges the symbol levels of following multilevel symbols by using the judgement levels stored in the judgement level memory 45. Meanwhile, the variation following calculating section 30 calculates the variation following levels from the symbol levels of the following multilevel symbols in the manner described in conjunction with FIG. 3. The variation following levels are substituted in the judgement level memory 45 for the judgement levels. Thereafter, the multilevel-to-binary converter 14 uses the variation following levels instead of the judgement levels.

While this invention has thus far been described in conjunction with a few preferred embodiments thereof, it will readily be possible for those skilled in the art to put this invention into practice in various manners. For example, in the radio paging receiver of FIG. 1, initial judgement levels may be preliminarily memorized in the difference memory 19 together with the predetermined difference to be stored in the RAM 15 as the judgement levels under control of the CPU 18 when a power source switch (not shown) of the radio paging receiver of FIG. 1 is turned on. Preferably, the variation following calculating circuit 30 of each of FIGS. 1, 4, and 5 suspends a calculation operation of the variation following levels on a predetermined duration in response to the pattern match signal which is produced by the coincidence detecting section 16.

What is claimed is:

1. A radio communication apparatus which is for receiving a multilevel modulated signal and which comprises: demodulating means for demodulating said multilevel modulated signal into a time sequence of multilevel symbols having symbol levels liable to a level variation to define a variable pattern by a level difference between the symbol levels of at least two adjacent ones of said multilevel symbols; and signal converting means for converting said time sequence of multilevel symbols into a binary signal of binary values by judging said symbol levels on the basis of judgement levels; wherein said signal converting means comprises:

coincidence detecting means for detecting coincidence between said variable pattern and a predetermined pattern to calculate said judgement levels when said variable pattern coincides with said predetermined pattern within a tolerance.

2. A radio communication apparatus as claimed in claim 1, said demodulating means having a sensitivity subjected to a sensitivity variation with time to give rise to a fluctuation in said symbol levels, wherein said tolerance is determined in consideration of said fluctuation.

3. A radio communication apparatus as claimed in claim 1, said multilevel modulated signal carrying an information signal directed to said apparatus for detection of said information signal, wherein said apparatus further comprises:

signal detecting means connected to said signal converting means for detecting said information signal in said binary signal.

4. A radio communication apparatus as claimed in claim 1, wherein said signal converting means further comprises:

variation following level calculating means for calculating variation following levels for use as said judgement levels by using said symbol levels, said binary values, and said judgement levels.

5. A radio communication apparatus as claimed in claim 4, the symbol levels of said time sequence of multilevel symbols being equal to a current level at a current time instant and a previous level at a previous time instant which precedes said current time instant, the level difference between said current and said previous levels defining said variable pattern, wherein:

said signal converting means comprises a random access memory in which said previous level is stored as a stored level;

said coincidence detecting means comprising:

a difference memory for preliminarily memorizing a predetermined difference defining said predetermined pattern;

pattern matching means for comparing said current level with said stored level to produce a pattern match signal when said variable pattern coincides with said predetermined pattern within said tolerance;

judgement level calculating means for calculating said judgement levels by using said current level and said stored level; and storing means for storing said judgement levels in said random access memory in response to said pattern match signal;

said signal converting means further comprising level judging means for judging said current level by using said judgement levels of said random access memory to produce said binary signal.

6. A radio communication apparatus as claimed in claim 5, wherein said pattern matching means comprises:

level difference calculating means for calculating the level difference between said current and said stored levels;

difference comparing means for comparing the level difference between said current and said stored levels with said predetermined difference to produce a coincidence signal when the level difference between said current and said stored levels coincides with said predetermined difference within said tolerance; and signal producing means for producing said pattern match signal in response to said coincidence signal.

7. A radio communication apparatus as claimed in claim 6, said multilevel modulated signal being a four-level modulated signal, said symbol levels being variable between a greatest maximum of a positive value and a least minimum of a negative value, said current level being equal to said least minimum V(t), said stored level being equal to said greatest maximum V(t−1), wherein said judgement level calculating means calculates said judgement levels V(ref, plus), V(ref, zero), and V(ref, minus) in accordance with equations:

$$V(\text{ref, plus}) = \{V(t-1) + V(t)\}/2 + \{V(t-1) - V(t)\}/3,$$

$$V(\text{ref, zero}) = \{V(t-1) + V(t)\}/2,$$

and $$V(\text{ref, minus}) = \{V(t-1) + V(t)\}/2 - \{V(t-1) - V(t)\}/3,$$

when said tolerance is put out of consideration.

8. A radio communication apparatus as claimed in claim 5, wherein:

said variation following level calculating means comprises:

ideal level calculating means for calculating, with reference to said judgement levels of said random access memory, an ideal level corresponding to said binary signal;

level difference calculating means for calculating a level difference between said current level and said ideal level;

following level calculating means for calculating said variation following levels by using said judgement levels of said random access memory and the level difference between said current level and said ideal level; and substituting means for substituting said variation following levels in said random access memory for said judgement levels;

said level judging means using said variation following levels instead of said judgement levels after said current time instant.

9. A radio communication apparatus as claimed in claim 4, the symbol levels of said time sequence of multilevel symbols being equal to a current level at a current time instant and a previous level at a previous time instant which precedes said current time instant, the level difference between said current and said previous levels defining said variable pattern, wherein:

said signal converting means comprises a judgement level memory;

said coincidence detecting means comprising:

a symbol level memory in which said previous level is stored as a stored level;

a difference memory for preliminarily memorizing a predetermined difference defining said predetermined pattern;

pattern matching means for comparing said current level with said stored level to produce a pattern match signal when said variable pattern coincides with said predetermined pattern within said tolerance;

judgement level calculating means for calculating said judgement levels by using said current level and said stored level; and storing means for storing said judgement levels in said judgement level memory in response to said pattern match signal;

said signal converting means further comprising level judging means for judging said current level by using said judgement levels of said judgement level memory to produce said binary signal.

10. A radio communication apparatus as claimed in claim 9, wherein said pattern matching means comprises:

level difference calculating means for calculating the level difference between said current and said stored levels;

difference comparing means for comparing the level difference between said current and said stored levels with said predetermined difference to produce a coincidence signal when the level difference between said current and said stored levels coincides with said predetermined difference within said tolerance; and signal producing means for producing said pattern match signal in response to said coincidence signal.

11. A radio communication apparatus as claimed in claim 10, said multilevel modulated signal being a four-level modulated signal, said symbol levels being variable between a greatest maximum of a positive value and a least minimum of a negative value, said current level being equal to said least minimum V(t), said stored level being equal to said greatest maximum V(t−1), wherein said judgement level calculating means calculates said judgement levels V(ref, plus), V(ref, zero), and V(ref, minus) in accordance with equations:

$$V(ref, plus) = \{V(t-1) + V(t)\}/2 + \{V(t-1) - V(t)\}/3,$$

$$V(ref, zero) = \{V(t-1) + V(t)\}/2,$$

and $$V(ref, minus) = \{V(t-1) + V(t)\}/2 - \{V(t-1) - V(t)\}/3,$$

when said tolerance is put out of consideration.

12. A radio communication apparatus as claimed in claim 9, wherein:
   said variation following level calculating means comprises:
   ideal level calculating means for calculating ideal levels by using said binary signal and said judgement levels of said judgement level memory;
   minimum level difference calculating means for calculating a minimum level difference between said current level and said ideal levels;
   following level calculating means for calculating said variation following levels by using said minimum level difference and said judgement levels of said judgement level memory; and
   substituting means for substituting said variation following levels in said judgement level memory for said judgement levels;
   said level judging means using said variation following levels instead of said judgement levels after said current time instant.

13. A radio communication apparatus which is for receiving a multilevel modulated signal and which comprises: demodulating means for demodulating said multilevel modulated signal into a time sequence of multilevel symbols having symbol levels liable to a level variation to define a variable pattern by at least two adjacent ones of said multilevel symbols; and signal converting means for converting said time sequence of multilevel symbols into a binary signal of binary values by judging said symbol levels on the basis of judgement levels; wherein said signal converting means comprises:
   coincidence detecting means for detecting coincidence between said variable pattern and a predetermined pattern to calculate said judgement levels when said variable pattern coincides with said predetermined pattern within a tolerance.

14. A radio communication apparatus as claimed in claim 13, wherein said signal converting means further comprises:
   variation following level calculating means for calculating variation following levels for use as said judgement levels by using said symbol levels, said binary values, and said judgement levels.

* * * * *

UNITED STATES PATENT AND TRADEMARK OFFICE
CERTIFICATE OF CORRECTION

PATENT NO. : 5,425,053
DATED : June 13, 1995
INVENTOR(S) : Mariko MATSUMOTO

It is certified that error(s) appears in the above-identified patent and that said Letters Patent is hereby corrected as shown below:

Col. 5, line 24, delete "store" and insert --stored in the symbol level memory 46 as the stored level. The judgment levels which appear in the signal line 25 are stored in the judgment level memory 45 in response to the pattern match signal (or the enable signal) which appears in the signal line 24.

Turning to Fig. 5, a radio paging receiver according to a third embodiment of this invention is similar to the radio paging receiver of Fig. 4 except for the following. In the illustrated receiver of Fig. 5,--.

Signed and Sealed this

Nineteenth Day of March, 1996

Attest:

BRUCE LEHMAN

*Attesting Officer*      *Commissioner of Patents and Trademarks*